Dec. 5, 1961 J. W. BURNSIDE 3,012,206

ELECTRONIC INVERTERS

Filed June 10, 1958

INVENTOR.
JAMES W. BURNSIDE
BY
Alexander & Dowell
ATTORNEYS

United States Patent Office 3,012,206

Patented Dec. 5, 1961

3,012,206

ELECTRONIC INVERTERS

James W. Burnside, Opa-Locka, Fla., assignor to Sunair Electronics, Inc., Fort Lauderdale, Fla., a corporation of Florida Filed June 10, 1958, Ser. No. 741,176
2 Claims. (Cl. 331—113)

This invention relates to D.C.-A.C. electronic inverters of the push-pull type, and more particularly relates to circuits by which the nominal input voltage rating may be doubled simply by effecting small circuit changes involving only the moving of two jumpers included in the circuit.

It is a principal object of the invention to provide in a circuit employing a transformer having an output secondary winding and having at least one push-pull pair of input windings wherein each winding is associated with an electronic valve means such as a transistor, novel associated resistance and capacitive elements and novel circuit-connecting jumpers whereby the said push-pull windings and transistors may be selectively connected either mutually in parallel for operation across a D.C. source of a certain nominal voltage, or alternatively may be connected mutually in series for operation across a source of D.C. at twice said nominal voltage. Such circuitry increases the versatility of inverter equipment so that one design may be made easily applicable to two different nominal input voltages.

It is another principal object of the invention to provide a symmetrical push-pull inverter in which the two symmetrical halves operate in push-pull as far as A.C. operation is concerned but may be connected in series with each other with respect to their source of D.C. supply voltage.

Another object of the invention is to provide a convertible-input inverter wherein the same transformer is used for both of said nominal input voltages without necessity of changing the connections between the transformer windings and the transistors associated therewith.

Yet another object of the invention is to provide a transistor inverter which can employ transistors each of which is rated at only half of the nominal supply voltage, this being of practical importance since the cost of transistors increases very rapidly as their voltage ratings are raised.

A further object of the invention is to provide a convertible-input inverter in which the damaging effects of transients in the input circuit, particularly troublesome in mobile equipment, are minimized especially during operation of the inverter in the series-connected arrangement of the jumpers wherein the current in the transistor circuit is limited to the energy stored in the said associated capacitive elements.

Another object of the invention is to provide a convertible-input inverter wherein no current can flow in the primary circuits unless a condition of push-pull operation exists, especially in self-oscillating circuits wherein any excessive loading across the secondary circuit causes oscillation to cease without damage to any of the circuit components.

Other objects and advantages of my invention will become apparent during the following discussion of the drawing, wherein.

Referring now to the practical embodiment shown in the drawing, most of the components appearing in both of the figures are identical, and therefore bear the same reference characters.

Figure 1:
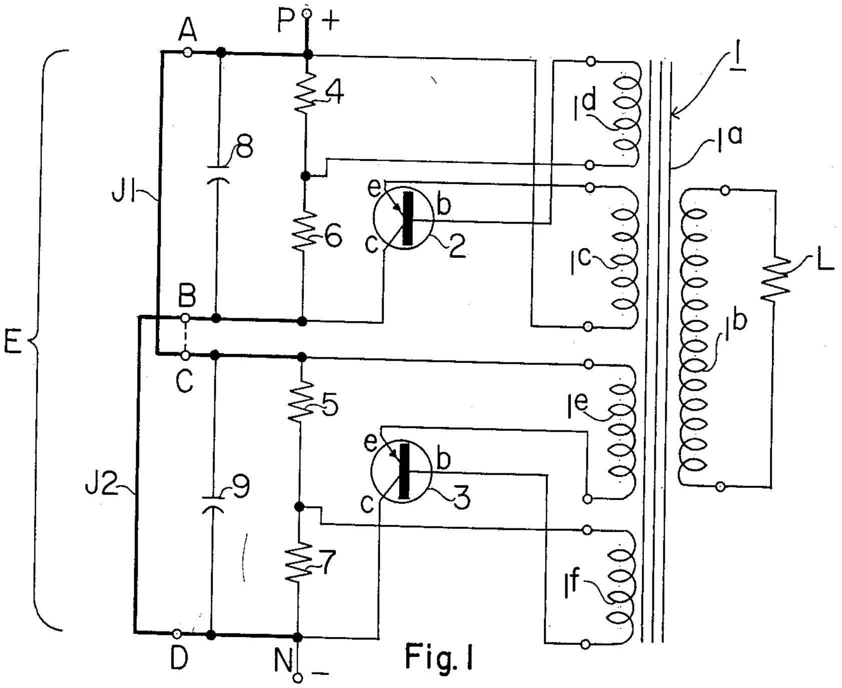
FIGURE 1 is a schematic diagram of a self-oscillating type of inverter showing one embodiment of my invention, the two push-pull halves of which are connected mutually in parallel for application across a source of D.C. at a certain nominal voltage.

In these figures, the circuit includes a transformer 1 having a saturable magnetic core 1*a* and having a secondary winding 1*b* comprising the A.C. output of the inverter circuit. This output winding 1*b* is shown connected across a load L which for the sake of simplicity is represented in the present disclosure as being a resistance.

The transformer 1 has four primary windings which divide themselves into two symmetrical pairs. The upper pair of primary windings includes a collector-emitter current winding 1*c* and a control winding 1*d*. The lower pair of windings includes another collector-emitter current winding 1*e* which corresponds with the current winding 1*c*, and in addition includes another control winding 1*f* which corresponds with the upper control winding 1*d*.

The upper pair of primary windings operates in push-pull with respect to the lower pair of primary windings and the upper windings are associated with an upper transistor 2. The lower pair of windings is associated with a lower transistor 3. Each of the transistors has a base terminal *b*, an emitter terminal *e*, and a collector terminal *c*. The upper half of the symmetrical push-pull circuit further includes a voltage divider comprising the resistors 4 and 6 and a condenser 8 connected thereacross, while the lower half of the symmetrical inverter circuit includes a voltage divider comprising the resistances 5 and 7 shunted by a condenser 9. The upper transistor 2 and the associated windings 1*c* and 1*d* are supplied substantially with the voltage appearing across the condenser 8, which is the same voltage as appears across the terminals A and B. Likewise, the lower transistor 3 and associated primary windings 1*e* and 1*f* operate substantially on the voltage appearing across the condenser 9 and thus across the terminals C and D. These voltages are supplied from a source of direct current (not shown) which is to be applied in the case of both circuits from the positive terminal P to the negative terminal N.

Figure 2:
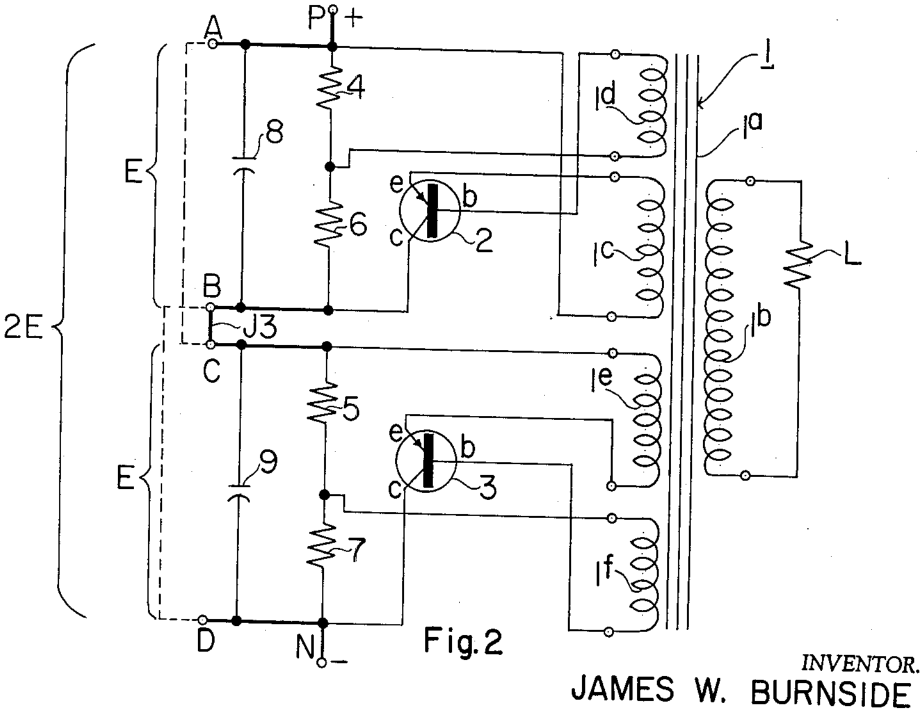
FIG. 2 is a schematic diagram of a circuit similar to that shown in FIG. 1, but wherein the two symmetrical halves of the push-pull circuit are connected mutually in series for application across a source of D.C. at twice the aforesaid nominal voltage.

In the circuit shown in FIG. 1, a voltage E is applied across the terminals P and N, and two jumpers J1 and J2 are connected respectively between the terminals A and C, and between the terminals B and D. In FIG. 2, these jumpers are not employed, but their location is marked by dashed lines.

In FIG. 2 no connection is made to the terminals A and D, but the terminals B and C are connected together by means of a jumper which is marked J3, although in a practical design the jumper J3 may comprise the jumpers J1 and J2 connected to terminals C and B and then mutually connected together. The jumper J3 is not present in FIG. 1, but its location is marked by dashed lines for the sake of indicating where it would be connected.

*Operation*

By comparison of the circuit in FIG. 1 with the circuit in FIG. 2, it will be seen that in both cases substantially the same voltages appear across each of the symmetrical push-pull halves. In FIG. 1 both terminals A and C are connected to the positive terminal P while both terminals B and D are connected to the negative terminal N. Therefore, the source voltage E appears across both halves of the circuit.

In FIG. 2 the terminals B and C are connected together so that the two symmetrical halves of the inverter are connected mutually in series across twice the source voltage E. Therefore, the voltages will divide approximately equally across the condensers 8 and 9.

By a comparison of the circuit by which the upper transistor is connected with its respective windings 1*c* and 1*d* with the circuit by which the lower transistor 3 is connected with its windings 1*e* and 1*f*, it will be seen that when one of the transistors is conducting, the other one remains nonconductive. In the present circuit diagrams the collectors of all of the trasistors go to a source of potential which is more negative than the source to which the emitters are connected, the transistors being PNP type. The bases of the transistors are connected through the respective control windings 1*d* and 1*f* to a point on each of the associated voltage dividers, at which point the bases will be forwardly biased to a certain extent. When supply voltage is applied to the circuit, assuming that one transistor will become conductive more rapidly than the other, a resultant flux will be generated in the core 1*a* of the transformer 1. Assume, for example, that transistor 2 becomes conductive more rapidly than transistor 3. In this case, the resulting flux which is generated in the core 1*a* of the transformer 1 will be in such a direction as to increase the forward bias on the base of the transistor 2 by inducing a forward control voltage in the winding 1*d*. At the same time, the flux in the core of the transformer will generate a current in the control winding 1*f* in such a direction as to bias the base of the transistor 3 in the reverse direction, thereby interrupting current flow through the winding 1*e* of the transistor 3.

The increased forward bias in the control winding 1*d* will drive the transistor 2 to saturation, and thereby cause maximum current to flow through the current winding 1*c* which is connected in the collector and emitter circuit of this transistor. Such current will continue to flow until the flux increase in the transformer 1 in the presently-assumed direction becomes zero. At that time, the effect thereof on the control winding 1*f* will also become zero and the forward bias applied to the base of the transistor 3 by the voltage divider 5—7 will cause the transistor 3 to begin conducting. When the transistor 3 begins conducting, the direction of flow of the current in its collector-emitter circuit through the current winding 1*e* will cause the base of the transistor 3 to be biased to saturation in the forward direction, while at the same time causing a current to appear in the winding 1*d* which will reverse bias the transistor 2 to cutoff. Self-oscillation in this well-known manner will be continuously sustained.

In the diagram shown in FIG. 1, the upper symmetrical half, including the transistor 2, the primary windings 1*c* and 1*d*, the voltage divider 4—6, and the condenser 8, are connected in parallel with the entire supply voltage E across the terminals P and N. Likewise, the lower symmetrical half comprising the transistor 3, the windings 1*e* and 1*f*, the voltage divider 5—7 and the condenser 9, are also connected in parallel with the upper circuit and across the terminals P and N and across the voltage E.

In contrast to the aforementioned circuit of FIG. 1, the circuit of FIG. 2 is intended to be applied across a total voltage 2E. In FIG. 2, the upper symmetrical half appearing across the terminals A and B is connected in series with the lower symmetrical half appearing between the terminals C and D, and these two halves as thus mutually connected in series are connected across the source of voltage 2E appearing across the terminals P and N.

In connection with this latter circuit, it is to be noted that only one of the transistors 2 or 3 is conductive at any one time and that the condensers 8 and 9 actually supply most of the current drawn by whichever transistor is conductive. In other words, the condensers 8 and 9 must be of sufficient capacity that the voltages to which they are charged will remain substantially steady despite the currents drawn from these condensers by each of the transistors when it is conductive. In view of the fact that whenever one of the transistors conducts the other one is nonconductive, there will not be at any one time a continuous D.C. path from the terminal P to the terminal N, except through the voltage divider resistances 4, 5, 6 and 7. Therefore, in the absence of the condensers 8 and 9 the circuit shown in FIG. 2 could not operate to furnish any appreciable amount of power since, whenever transistor was conductive, the current drawn thereby would have to be drawn through the voltage divider resistances associated with the opposite nonconductive transistor. The presence of the condensers is therefore essential to the functioning of the circuit shown in FIG. 2.

I do not limit my invention to the exact form shown in the drawings, but instead contemplate that certain changes may be made therein. For example, it is not necessary that the circuit be of the self-oscillating type, but rather the conduction of the electronic valve means may be determined by an external control voltage in a manner known per se and as shown in issued patents, such as Patent No. 2,783,384 to Bright. Other changes can be made within the scope of the following claims.

I claim:

1. An electronic inverter for delivering an alternating current output from a source of direct current power having one of two nominal voltages wherein the higher voltage is double the lower voltage, said inverter comprising transformer means having a secondary winding for delivering said alternating current output and having two primary windings; at least two electronic valve means each having a main current-path electrode, a control path electrode and a common electrode which is common to both paths, and said common and main electrodes being connected in series with a primary winding and forming separate series circuits each terminating in a pair of terminals, and said source of power being connected with one chosen terminal in each pair; voltage divider means connected between the terminals in each pair; two valve control winding means on the transformer means and each connected between a point on a voltage divider and the control electrode of the corresponding valve means and oriented relative to the polarities of the primary windings to bias said valves alternately conductive in push-pull; a capacitor connected across each pair of terminals; and jumper means connected with the non-chosen terminals of the pairs and said jumpers selectively connecting the pairs of terminals mutually in parallel for use across a source at said lower voltage or mutually in series for use across a source at said higher voltage.

2. An electronic inverter for delivering an alternating current output from a source of direct current power having one of two nominal voltages wherein the higher voltage is double the lower voltage, said inverter comprising transformer means having a secondary winding for delivering said alternating current output and having at least two primary windings; two transistors each having an emitter-collector electrode circuit connected in series with one of said primary windings and forming separate series circuits each terminating in a pair of terminals including a plus and a minus terminal, and said source of power being connected with a chosen plus terminal of one pair and a chosen minus terminal of the other pair; voltage divider means connected between the terminals in each pair; transistor control winding means on the transformer means and connected between each transistor base and a point on a voltage divider means and oriented relative to the polarities of the primary windings to bias said transistors alternately conductive in push-pull; a capacitor connected across each pair of plus and minus terminals; and jumper means connected with the non-chosen terminal of each pair of said jumpers selectively connecting the pairs of terminals mutually in parallel for use across said source at said lower voltage or mutually in series for use across a source at said higher voltage.

References Cited in the file of this patent

UNITED STATES PATENTS

| | | |
|---|---|---|
| 2,299,094 | Klemperer | Oct. 20, 1942 |
| 2,783,384 | Bright et al. | Feb. 26, 1957 |
| 2,830,200 | Backman et al. | Apr. 8, 1958 |
| 2,849,614 | Royer et al. | Aug. 26, 1958 |

FOREIGN PATENTS

| | | |
|---|---|---|
| 536,516 | Great Britain | May 16, 1941 |

OTHER REFERENCES

Article by Light in Wireless World, pages 582–586, December 1955.